June 17, 1958     R. DOUCOT     2,839,710
RECTIFIER ASSEMBLIES
Filed Jan. 13, 1956

INVENTOR.
Roger Doucot
BY W. L. Stout
HIS ATTORNEY 2,839,710
Patented June 17, 1958

United States Patent Office

2,839,710
RECTIFIER ASSEMBLIES

Roger Doucot, Sevran, France, assignor to Compagnie des Freins et Signaux Westinghouse, Paris, France Application January 13, 1956, Serial No. 559,019

Claims priority, application France May 12, 1955

9 Claims. (Cl. 317—234)

My invention relates to rectifier assemblies, and particularly to an assembly of a plurality of unperforated rectifier plates or discs.

The larger rectifier stacks operating at higher current densities are generally assembled by mounting the rectifier plates on insulated rods or bolts passing through openings provided in the rectifier plates, the plates being separated by suitable washers and the like to provide ventilation between the rectifier elements. Attempts have been made to assemble stacks of large unperforated rectifier elements, but such assemblies have proven to be relatively complicated and require in general the use of specially adapted and machined parts. Such assemblies furthermore do not prevent slipping or misalignment of the rectifier elements or parts during the course of assembling such stacks, or during the subsequent handling of the assembled stacks.

It is therefore an object of my invention to provide a rectifier stack of unperforated rectifier elements comprising few and simple parts easily assembled, the parts being arranged to provide a rigid assembly for maintaining the rectifier elements and parts in alignment and adequate ventilation of the elements during operation to prevent excessive heating.

In carrying out my invention, I provide a plurality of unperforated rectifier plates mounted in a support formed from two end pieces, preferably of insulating material, interconnected by elongated supporting members which are preferably angle shaped in cross section. The rectifier plates are preferably square in shape, the diagonally opposite corners of the plates being supported in the grooves provided by the supporting members. The individual rectifier plates are separated by substantially U-shaped spacers, the spacers forming chimneys between the elements to permit ventilation of the rectifier plates during operation. A pressure spring interposed between one of the end pieces and an end rectifier element provides the necessary pressure to hold the assembled plates in place. Circuit connections may be made to the individual rectifier plates or to combinations thereof as the need requires.

Other objects and characteristic features of my invention will become apparent as the description proceeds.

I shall describe two forms of rectifier stacks embodying my invention, and shall then point out the novel features thereof in claims.

In the accompanying drawings, wherein similar reference characters designate similar parts throughout the several views, Fig. 1 is a side elevational view of a rectifier stack embodying my invention, portions thereof being broken away for illustrating the parts to better advantage.

Figs. 5, 6 and 7 are views corresponding to Figs. 1, 2 and 3, respectively, of a second embodiment of my invention, while

Figure 1:
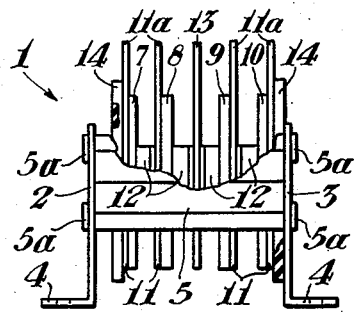
Figure 2:
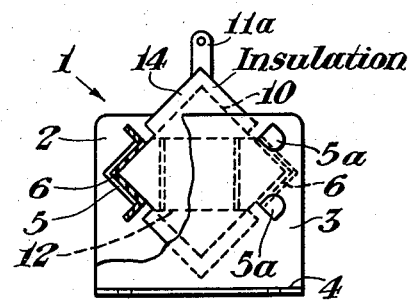
Fig. 2 is an end view of the rectifier stack, portions being broken away and shown in cross section.
Figure 3:
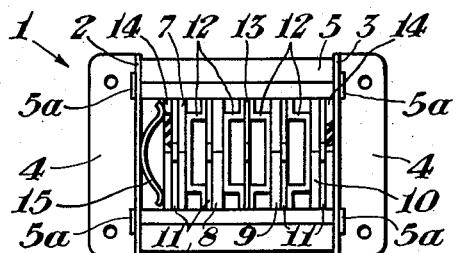
Fig. 3 is a top plan view of the rectifier stack.
Figure 4:
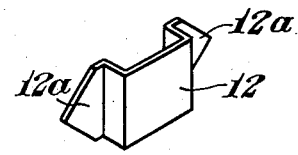
Fig. 4 is an isometric view of a spacer interposed between the elements of the rectifier stack.
Figure 5:
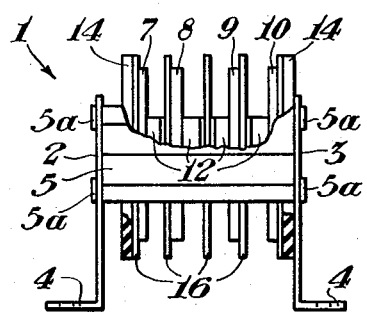
Figure 6:
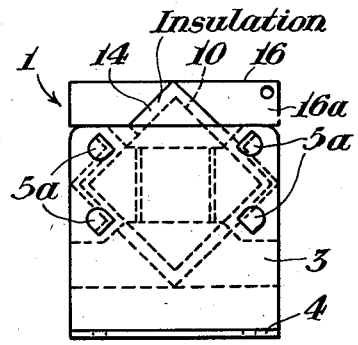
Figure 7:
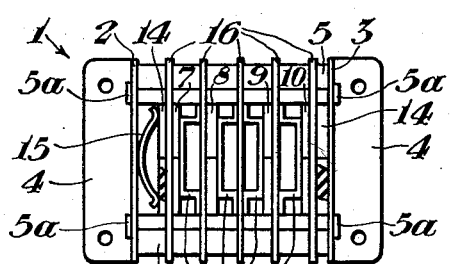
Figure 8:
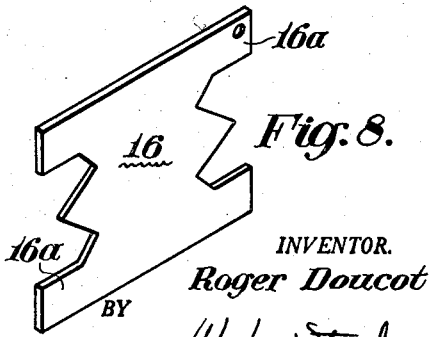
Fig. 8 is an isometric view of a contact plate forming a part of the stack illustrated in Figs. 5 to 7.

Referring now in detail to Figs. 1 to 4 of the drawings, the reference character 1 designates a rectifier assembly embodying my invention. The rectifier assembly comprises two end plates 2 and 3 formed with mounting legs 4, the end plates being of metal or insulating material. The two end plates 2 and 3 are interconnected by means of two elongated supporting members 5 angle-shaped in cross section, as illustrated in Fig. 2, to provide two opposed continuous grooves or notches on both sides of the assembly. The angle supporting members 5 are secured at their ends to the end plates by means of tabs or ears 5a which are inserted through suitable angularly disposed slits provided in the end plates, the tabs being bent back on the end plates. The angle supporting members 5 may be of metal or insulating material. In the case of metal supporting members, a liner 6 of insulating material is provided for the continuous grooves formed by the supporting members.

Disposed in the angle supporting members 5 are a plurality of rectifier plates 7, 8, 9 and 10, the rectifier plates being illustrated square shaped with the diagonally opposite corners inserted into the grooves or ledges formed by the angle members. Engaging the rectifier plates 7 to 10 are contact plates 11 which may also be square shaped and supported at diagonal corners in the supporting members 5. The contact plates are formed with tabs 11a which extend above the rectifier assembly and by means of which the rectifier plates may be connected into an electrical circuit. It will be apparent that the base plate of the rectifier elements may be formed with an extending tab 11a, in which event the separate contact plates would not be required. In the particular example of the rectifier assembly illustrated in Figs. 1 to 4, the rectifier plates 7 and 8 and plates 9 and 10 are electrically interconnected by substantially U-shaped spacers 12 of conducting material interposed between the paired rectifier plates. The U-shaped spacers 12 (Fig. 4) are formed with divergent legs 12a formed to fit the grooves provided by the angle supporting members 5. A spacer 12 is also interposed between the rectifier plate 8 and a contact plate 13 supported in the angled members and between the contact plate 13 and the rectifier plate 9. Obviously, the rectifier plates may be interconnected in the stacked assembly by the spacers in other combinations, or the individual rectifier plates may be insulated from one another.

To complete the assembly, insulating plates 14 of substantially square configuration are interposed between the end elements of the stack and the end plates, the insulating plates being supported at diagonal opposite corners in the supporting members 5. A bowed spring 15 with ends preferably received within the continuous grooves of members 5 is inserted between the end plate 2 and the insulating plate to hold the assembled elements transversely disposed relative to the supporting members and to supply the necessary contact pressure between the contact members, spacers, and rectifier plates.

In Figs. 5 to 8, I have illustrated another embodiment of my invention, the rectifier assembly 1 comprising essentially the same elements described in connection with the assembly of Figs. 1 to 4. In the second embodiment of my invention, contact plates 16 are substituted for the contact plates 11 and 13, the contact plates 16 being provided with extended cooling ribs 16a (Fig. 8) which permit operation of the rectifier at increased current levels without excessive heating of the rectifier elements.

It will be understood that the rectifier plates, contact members and insulation plates need not be square-shaped as herein illustrated but may take various forms such as rectangular, polygonal, or even circular. In place of the angle supporting members interconnecting the two end plates of the assembly, the end plates may be secured and the stack elements supported by two pairs of rods or bars spaced apart and positioned substantially in the locations of the turned-in fastening tabs of the supporting members. Thus the diametrically opposite sections of the perimeter of the rectifier plates, regardless of their shape, will be received between the pairs of rods in much the same manner as the corner sections of the perimeters of the square rectifier plates are received in the recesses or ledges of the angle supporting members.

I have thus provided a compact rectifier assembly of unperforated rectifier plates which are held in rigid assembly by means of end plates and interconnecting supporting members, the parts and elements of the assembly being few and simple and readily assembled without special tools or jigs, the assembly of the parts being such that adequate ventilation is provided for the parts to prevent excessive heating during operation.

Although I have herein shown and described only two rectifier assemblies embodying my invention, it will be understood that various changes and modifications may be made therein within the scope of the appended claims without departing from the spirit and scope of my invention.

Having thus described my invention, what I claim is:

1. A rectifier assembly comprising, a frame having two end members and two elongated supporting members substantially angle-shaped in cross section secured to said end members in spaced parallel relation, said supporting members constituting opposing continuous grooves, a plurality of rectifier elements having opposed perimeter portions received within the grooves, said rectifier elements being transversely disposed relative to said supporting members; means for making circuit connections with said rectifier elements including substantially U-shaped spacing members interposed between said elements, and resilient means interposed between an end member and said rectifier elements to hold said elements and circuit making connections in assembled arrangement in said frame.

2. A rectifier assembly comprising, a frame having two end members and elongated supporting members secured to said end members in spaced parallel relation, said supporting members constituting opposing continuous grooves, a plurality of rectifier elements having opposed perimeter portions received within the grooves, said rectifier elements being transversely disposed relative to said supporting members; means for making circuit connections with said rectifier elements including substantially U-shaped spacing members interposed between said elements, said spacing members having divergent legs receivable within the continuous grooves; and resilient means interposed between an end member and said rectifier elements to hold said elements and circuit making connections in assembled arrangement in said frame.

3. A rectifier assembly comprising, a frame having two end members and elongated supporting members secured to said end members in spaced parallel relation, said supporting members constituting opposing continuous grooves, a plurality of rectifier elements having opposed perimeter portions received within the grooves, said rectifier elements being transversely disposed relative to said supporting members; means for making circuit connections with said rectifier elements including substantially U-shaped spacing members interposed between said elements, said spacing members having divergent legs receivable within the continuous grooves; and resilient means supported in said grooves and interposed between an end member and said rectifier elements to hold said elements and circuit making connections in assembled arrangement in said frame.

4. A rectifier assembly comprising, a frame having end members and elongated supporting members secured to said end members in spaced parallel relation, said supporting members forming opposing continuous grooves, a plurality of rectifier elements of polygonal shape transversely disposed to said supporting members and having opposite perimeter sections received within the grooves, polygonal shaped contact members supported in said grooves for making circuit connections to said rectifier elements, substantially U-shaped spacer elements interposed between said rectifier elements and said contact members for electrically interconnecting the rectifier elements and the contact members, said spacer elements forming chimneys between the elements and members to provide ventilation spaces, insulating members interposed between said rectifier elements and said end members, and a bowed spring interposed between an end member and an insulating member to apply pressure to said rectifier elements, contact members and spacers to hold the same in assembled arrangement in said frame.

5. A rectifier assembly comprising, a frame having end members and elongated supporting members secured to said end members in spaced parallel relation, said supporting members forming opposing continuous grooves, a plurality of rectifier elements of polygonal shape transversely disposed to said supporting members and having opposite perimeter sections received within the grooves, polygonal shaped contact members supported in said grooves for making circuit connections to said rectifier elements, substantially U-shaped spacer elements interposed between said rectifier elements and said contact members for electrically interconnecting the rectifier elements and the contact members, said spacer elements having divergent ends receivable within said grooves, said spacer elements forming chimneys between the elements and members to provide ventilation spaces, insulating members interposed between said rectifier elements and said end members, and a bowed spring interposed between an end member and an insulating member to apply pressure to said rectifier elements, contact members and spacers to hold the same in assembled arrangement in said frame.

6. A rectifier assembly comprising, a frame having end members and elongated supporting members secured to said end members in spaced parallel relation, said supporting members forming opposing continuous grooves, a plurality of rectifier elements of polygonal shape transversely disposed to said supporting members and having opposite perimeter sections received within the grooves, polygonal shaped contact members supported in said grooves for making circuit connections to said rectifier elements, substantially U-shaped spacer elements interposed between said rectifier elements and said contact members for electrically interconnecting the rectifier elements and the contact members, said spacer elements have divergent ends receivable within said grooves, said spaced elements forming chimneys between the elements and members to provide ventilation spaces, insulating liners for said grooves, insulating members interposed between said rectifier elements and said end members, and a bowed spring interposed between an end member and an insulating member to apply pressure to said rectifier elements, contact members and spacers to hold the same in assembled arrangement in said frame.

7. A rectifier assembly comprising, a frame having end members and elongated supporting members secured to said end members in spaced parallel relation, said supporting members forming opposing continuous grooves, a plurality of rectifier elements of polygonal shape transversely disposed to said supporting members and having opposite perimeter sections received within the grooves, polygonal shaped contact members supported in said grooves for making circuit connections to said rectifier elements, substantially U-shaped spacer elements interposed between said rectifier elements and said contact members for electrically interconnecting the rectifier elements and the contact members, said spacer elements having divergent ends receivable within said grooves, said spacer elements forming chimneys between the elements and members to provide ventilation spaces, insulating liners for said grooves, insulating members interposed between said rectifier elements and said end members, and a bowed spring having ends received within said grooves, said spring being interposed between an end member and an insulating member to apply pressure to said rectifier elements, contact members and spacers to hold the same in assembled arrangement in said frame.

8. A rectifier assembly comprising, a frame having end members and elongated supporting members secured to said end members in spaced parallel relation, said supporting members forming opposing continuous grooves, a plurality of rectifier elements of polygonal shape transversely disposed to said supporting members and having opposite perimeter sections received within the grooves, polygonal shaped contact members supported in said grooves for making circuit connections to said rectifier elements, said contact members being formed with extending cooling ribs; substantially U-shaped spacer elements interposed between said rectifier elements and said contact members for electrically interconnecting the rectifier elements and the contact members, said spacer elements having divergent ends receivable within said grooves, said spacer elements forming chimneys between the elements and members to provide ventilation spaces, insulating members interposed between said rectifier elements and said end members, and a bowed spring interposed between an end member and an insulating member to apply pressure to said rectifier elements, contact members and spacers to hold the same in assembled arrangement in said frame.

9. A rectifier assembly comprising, a frame having end members and elongated supporting members secured to said end members in spaced parallel relation, said supporting members forming opposing continuous grooves, a plurality of rectifier elements of polygonal shape transversely disposed to said supporting members and having opposite perimeter sections received within the grooves, polygonal shaped contact members supported in said grooves for making circuit connections to said rectifier elements, said contact members being formed with extending cooling ribs; substantially U-shaped spacer elements interposed between said rectifier elements and said contact members for electrically interconnecting the rectifier elements and the contact members, said spacer elements having divergent ends receivable within said grooves, said spacer elements forming chimneys between the elements and members to provide ventilation spaces, insulating liners for said grooves, insulating members interposed between said rectifier elements and said end members, and a bowed spring having ends received within said grooves, said spring being interposed between an end member and an insulating member to apply pressure to said rectifier elements, contact members and spacers to hold the same in assembled arrangement in said frame.

References Cited in the file of this patent

UNITED STATES PATENTS

| | | |
|---|---|---|
| 2,698,918 | Eisele et al. | Jan. 4, 1955 |
| 2,764,717 | Vanderhoof | Sept. 25, 1956 |